Oct. 15, 1963  J. B. GODSHALK  3,106,907
POULTRY WATERING DEVICES

Original Filed Nov. 6, 1958  2 Sheets-Sheet 1

INVENTOR.
JAMES B. GODSHALK
BY Arnold & Roylance
ATTORNEYS

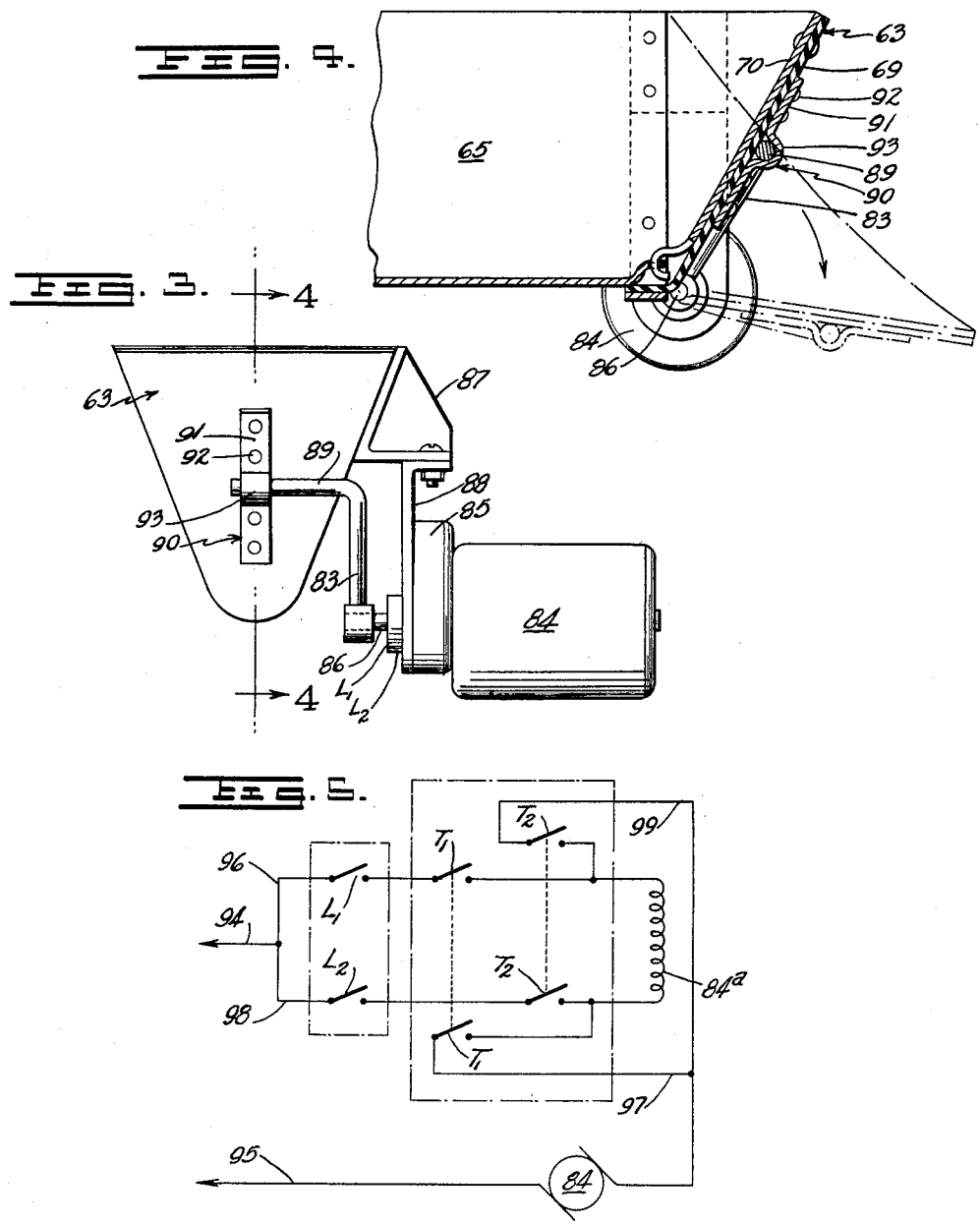

United States Patent Office 3,106,907
Patented Oct. 15, 1963

3,106,907
POULTRY WATERING DEVICES
James B. Godshalk, Chester Springs, Pa., assignor to Fox Products Company, Philadelphia, Pa., a corporation of Pennsylvania
Original application Nov. 6, 1958, Ser. No. 772,213, now Patent No. 3,023,770, dated Mar. 6, 1962. Divided and this application Oct. 31, 1961, Ser. No. 148,926
5 Claims. (Cl. 119—72)

This invention relates to poultry watering devices, such as automatic poultry watering troughs, and to drain and filing features thereof. This application is a division of my copending application Serial Number 772,213, filed November 6, 1958, and now Patent 3,023,770.

In the raising of chickens, turkeys, etc., it is now the common practice to employ automatic watering devices including a trough or similar container which is supplied with water via an automatically operated valve to maintain the water at a predetermined level. While such devices are widely used with considerable success, they have the drawback that the trough or other container must be periodically cleaned manually to remove ordinary dirt, drippings, and such other foreign material as may tend to pollute the water and clog the system. To solve this difficulty, it has heretofore been proposed that the water be flowed continually through the trough and thus carry away the dirt and the like. Arrangements to accomplish this have, however, not been satisfactory on a commercial basis because of the tendency for the necessary drain equipment to become clogged so that the troughs overflowed. Further, such arrangements rather drastically increase the water consumption and are therefore uneconomical.

An object of the present invention is to provide an improved poultry watering device having means whereby the trough or other watering container is periodically drained in such fashion as to rapidly flush out the same and therefore accomplish satisfactory cleaning.

Another object is to provide an improved automatic drain mechanism for poultry watering troughs and the like.

A further object is to devise an improved drain mechanism which obviates the necessity for employing an outflow valve of the type comprising a movable valve element working in combination with a seat.

Yet another object is to provide certain valuable improvements in poultry watering equipment which are particularly applicable to situations where very long watering troughs are employed.

A further object is to devise a novel, automatic drain system for poultry watering devices which is substantially completely free from any tendency to jam or to become clogged.

In order that the manner in which these and other objects are accomplished in accordance with the invention can be understood in detail, reference is had to the accompanying drawings, which form a part of this specification, and wherein:

FIG. 3 is an end elevational view of a poultry trough drain device constructed in accordance with another embodiment of the invention;

FIG. 4 is a longitudinal vertical sectional view on line 4—4, FIG. 3; and

FIG. 5 is a schematic diagram illustrating the electrical motor control circuit employed in the device of FIGS. 3 and 4.

Figure 1:
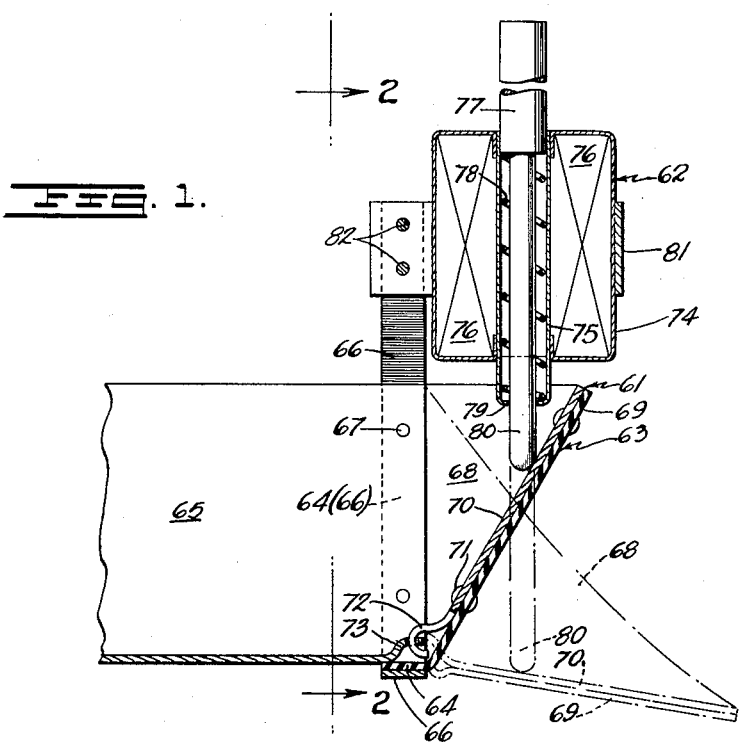
FIG. 1 is a view partly in elevation and partly in vertical section of a poultry trough drain means constructed in accordance with one embodiment of the invention.

Before referring to the drawings in detail, it is to be understood that this invention is applicable to the usual elongated poultry watering trough equipped with an automatic filling valve of any of the conventional types, either electrically operated or weight operated, all as described in detail in the aforesaid copending application Serial Number 772,213. Turning now to the drawings, it will be seen that the automatic drain device of this embodiment involves a pivoted trough end closure, indicated at 61, arranged for actuation by an electromagnetic device indicated generally at 62. End closure 61 includes a molded, flexible rubber closure member 63 having a continuous edge portion 64 overlapping the outer face of the open end of trough 65 and secured thereto in fluid-tight relation by a metal strip 66 and rivets or other suitable fastening devices 67. Flexible closure member 63 has generally triangular side portions 68 and a flat end wall 69. A metal plate 70 is secured to the inner face of end wall 69 in any suitable fashion, as by rivets 71, and is provided at its bottom end with a curved finger 72 extending freely through a slot in an upwardly offset tongue 73 formed at the bottom of the trough end. Thus, elements 72, 73 combine to form a hinge about which the end closure is actuated.

Closure member 63 is resilient in nature, tending normally to occupy the position illustrated in solid lines in FIG. 1, in which position the end of trough 65 is closed so that water can be maintained at a desired level in the trough. Closure member 63 can be actuated to the open position, illustrated in phantom lines in FIG. 1, by electromagnetic device 62.

Figure 2:
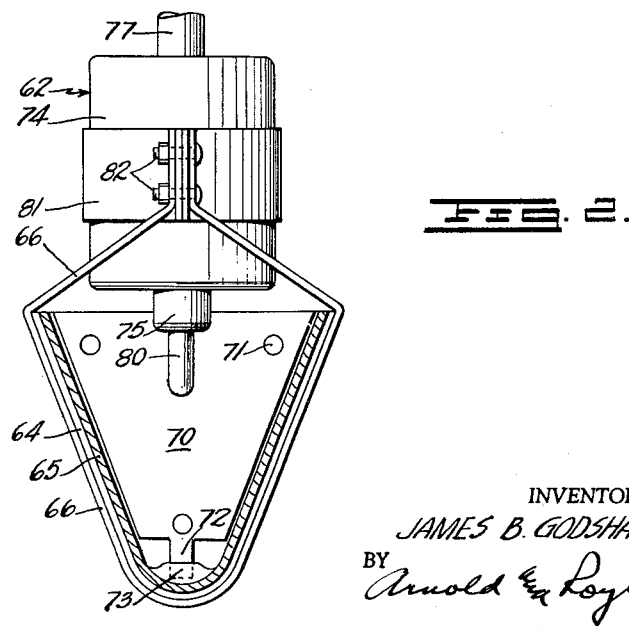
FIG. 2 is a transverse vertical sectional view taken on line 2—2, FIG. 1.

Actuator 62 includes a cylindrical housing 74 having axially aligned end openings accommodating a centrally disposed guide tube 75, electromagnetic actuating winding 76 being disposed within the housing about the guide tube. The core 77 of the device, made of a material of high magnetic permeability, is urged to a normal upper position by a helical compression spring 78 working between the bottom end of the core and an inturned flange 79 at the bottom end of tube 75. An actuating plunger 80, formed integrally with or rigidly fixed to core 77, extends downwardly through tube 75, the rounded nose of the plunger directly engaging plate 70. Housing 74 is carried by a mounting strap 81, the ends of which are brought together and secured between the ends of strap 66, as by bolts 82, in the manner best seen in FIG. 2.

Winding 76 of actuator 62 is supplied with current and controlled in the manner described in detail in my aforementioned parent application Serial Number 772,-213. Hence, the winding 76 is periodically energized, causing core 77 to be drawn downwardly, against the biasing action of spring 78. As the core descends, plunger 80 forces plate 70 to pivot downwardly, closure member 63 thus being distorted until the parts reach the open position illustrated by the phantom lines of FIG. 1. The end closure is maintained in such open position, allowing the water to be drained from trough 65 and the trough thus to be flushed, until winding 76 is again de-energized. Spring 78 then raises core 77 and plunger 80 to their raised positions, seen in full lines in FIG. 1, and closure member 63 returns to its trough closing position by reason of its inherent resiliency.

The embodiment of FIGS. 3–5 employs a flexible, trough end closure means similar to that just described but in connection with a rotary actuator. Here, the closure member 63, trough 65 and hinged plate 70 remain as described with reference to FIGS. 1 and 2, but pivotal movement of plate 70, and hence distortion of member 63 to open position, are accomplished through a crank 83 driven by an electric motor 84 via speed reduction gear box 85. Crank 83 is fixed to output shaft 86 of the gear box, the entire unit being supported from a side wall of the trough by brackets 87, 88 in such fashion that the drive shaft 86 extends transversely with respect to the trough and, as seen in FIG. 4, is substantially aligned with the pivotal axis of trough end closure member 63.

Crank 83 has a portion 89 extending parallel to shaft 86 and rotatably attached to end closure member 63 by a bearing bracket 90. Bracket 90 includes straight end portions 91, secured to elements 69, 70 by rivets 92, and a central, semicircular portion 93 embracing portion 89 of the crank and urging the same lightly against the outer surface of molded rubber member 63.

Accordingly, when drive shaft 86 is rotated clockwise, as viewed in FIG. 4, the resulting turning motion of the crank will actuate the end closure member 63 to the open, trough-draining position illustrated in phantom lines in FIG. 4. Conversely, an appropriate amount of counter-clockwise rotation of shaft 86 will, through crank 83, return the closure to the position illustrated in full lines in FIG. 4, wherein that member is effective to close the end of the trough.

In order to accomplish proper control of motor 84, the circuit of FIG. 5 is employed. Motor 84 is an A.C.—D.C. universal series motor of conventional type, reversible by reversing the direction of current flow through field coil 84$^a$. The control circuit includes two "open" switches $T_1$ and two "close" switches $T_2$, all actuated by a suitable time clock mechanism, and two limit switches $L_1$ and $L_2$ actuated by output shaft 86. Field coil 84$^a$ is connected to supply conductors 94, 95 via either conductors 96 and 97, for operation of the motor in a clockwise direction, as viewed in FIG. 4, or conductors 98 and 99, for operation of the motor in the reverse direction. Limit switch $L_1$ and time switches $T_1$ are connected in series in the combination of conductors 96, 97. Limit switch $L_2$ and time switches $T_2$ are connected in series in the combination of conductors 98, 99.

Limit switch $L_1$ is so arranged on shaft 86 as to be maintained closed until the shaft is so rotated that closure member 63 approaches the position seen in phantom lines in FIG. 4, at which time switch $L_1$ opens. Limit switch $L_2$ is so arranged on shaft 86 as to be maintained closed until the shaft, during counter-clockwise rotation as viewed in FIG. 4, moves closure member 63 substantially to the closed position illustrated in full lines. "Open" and "close" switches $T_1$ and $T_2$ can be considered as normally open and are so actuated by the timer mechanism that, in a given time period, such as 24 hours, switches $T_1$ are first closed to cause motor 84 to actuate closure member 63 to full open, trough-draining position, the circuit then being broken by opening of limit switch $L_1$. Switches $T_2$ are then closed by the timer mechanism after a predetermined draining period, say 5 minutes, causing the motor to operate in the reverse direction, positively driving closure member 63 to the closed position, limit switch $L_2$ now acting to interrupt the circuit. Since the series circuit portions including the switches are dominated by the positively actuated limit switches, the opening times for switches $T_1$ and $T_2$ are not critical. The open-drain-close cycle just described is carried out only once during the predetermined time period involved.

While certain advantageous embodiments have been chosen to illustrate the invention, it will be understood by those skilled in the art that various changes and modifications can be made therein without departing from the scope of the invention as defined in the appended claims.

I claim:
1. In a watering device of the type used to supply water to poultry
   an elongated generally horizontally disposed watering trough having one end thereof open
   a flexible end closure having edge portions fixedly secured in fluid-tight relation to said open end of said trough,
   said end closure having a normal shape such as to extend across the open end of the trough to close said open end to confine at least a predetermined amount of liquid in said trough for consumption by poultry,
   said end closure being distortable to a trough draining position in which said open end of said trough is substantially open and unobstructed and in which at least a portion of said closure is positioned below the plane of the bottom of said trough to permit a rapid flow of liquid from said trough,
   an actuating device, and
   means connecting said actuating device to said end closure, said actuating device and said connecting means being operable to distort said end closure to said trough draining position.

2. A watering device in accordance with claim 1 in which said connecting means comprises at least in part a rigid member secured to said flexible end closure, and said actuating device is operable to pivot at least a portion of said rigid member from a generally vertical position to a generally horizontal position in which at least a portion of said rigid member is disposed below the plane of the bottom of said trough thereby distorting said end closure to said trough draining position.

3. A watering device in accordance with claim 1 and wherein said closure member is of thin, resilient material.

4. A watering device in accordance with claim 3 and where in said actuating device is an electromagnet and the means connecting the same to said closure member is a plunger.

5. A watering device in accordance with claim 1 and wherein said actuating device is a rotary electric motor and the means connecting the same to said closure member is a crank.

References Cited in the file of this patent
UNITED STATES PATENTS

| 2,100,154 | Ashton | Nov. 23, 1937 |
| 2,850,258 | Lazich | Sept. 2, 1958 |
| 2,886,218 | Marcus | May 12, 1959 |